(12) United States Patent
Wang et al.

(10) Patent No.: US 12,198,013 B1
(45) Date of Patent: Jan. 14, 2025

(54) CALIBRATING A QUANTUM ERROR MITIGATION TECHNIQUE

(71) Applicant: International Business Machines Corporation, Armonk, NY (US)

(72) Inventors: Derek Wang, New York, NY (US); Ritajit Majumdar, Kolkata (IN); Pedro Rivero Ramirez, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 53 days.

(21) Appl. No.: 18/219,634

(22) Filed: Jul. 7, 2023

(51) Int. Cl.
G06N 10/70 (2022.01)

(52) U.S. Cl.
CPC ................. G06N 10/70 (2022.01)

(58) Field of Classification Search
CPC ................................................ G06N 10/70
See application file for complete search history.

(56) References Cited

U.S. PATENT DOCUMENTS

| | | | |
|---|---|---|---|
| 8,089,286 B2 | 1/2012 | Silva et al. | |
| 11,475,189 B2 | 10/2022 | Gunnels et al. | |
| 2020/0175409 A1* | 6/2020 | Kandala | G06N 10/70 |
| 2021/0399743 A1 | 12/2021 | Zheng et al. | |
| 2022/0198315 A1 | 6/2022 | Wang et al. | |
| 2023/0054391 A1 | 2/2023 | Wang | |
| 2023/0121176 A1* | 4/2023 | Zhang | G06N 3/084 706/17 |

(Continued)

FOREIGN PATENT DOCUMENTS

| | | |
|---|---|---|
| CN | 112529194 A | 3/2021 |
| CN | 114970871 A | 8/2022 |
| CN | 115271083 A | 11/2022 |

OTHER PUBLICATIONS

Mitiq, "Calibration—Mitiq 0.26.0 Documentation," https://mitiq.readthedocs.io/en/stable/guide/calibrators.html, 2023, pp. 1-2.

(Continued)

*Primary Examiner* — Matthew M Kim
*Assistant Examiner* — Matthew N Putaraksa
(74) *Attorney, Agent, or Firm* — Shackelford, McKinley & Norton, LLP; Robert A. Voigt, Jr.

(57) ABSTRACT

A method, system and computer program product for calibrating a quantum error mitigation technique with appropriate settings. Calibrations of the quantum error mitigation technique corresponding to combinations of noise factors and extrapolation functions that when applied to quantum circuits that represent the target quantum circuit achieve an expectation value that is close to a zero-noise value within a threshold degree of accuracy are saved. A calibration (combination of noise factors and an extrapolation function) is then selected from the saved calibrations based on the depth of the target quantum circuit. The quantum error mitigation technique is then calibrated based on the selected calibration. The calibrated quantum error mitigation technique is then performed on the target quantum circuit. In this manner, a quantum error mitigation technique is automatically calibrated with the appropriate settings to achieve a zero-noise value by the target quantum circuit without requiring multiple iterations.

20 Claims, 4 Drawing Sheets

(56) References Cited

U.S. PATENT DOCUMENTS

2023/0153667 A1\* 5/2023 Kandala ................. H10N 60/12
   257/31
2023/0196173 A1\* 6/2023 Cai ...................... G06F 11/079
   714/37

OTHER PUBLICATIONS

Lowe et al., "Unified Approach to Data-Driven Quantum Error Mitigation," arXiv:2011.01157v2, Aug. 2, 2021, pp. 1-12.

\* cited by examiner

CALIBRATING A QUANTUM ERROR MITIGATION TECHNIQUE

TECHNICAL FIELD

The present disclosure relates generally to quantum error mitigation techniques, and more particularly to calibrating a quantum error mitigation technique (e.g., zero noise extrapolation) with the best settings to achieve a zero-noise value by the target quantum circuit without requiring multiple iterations.

BACKGROUND

Current quantum hardware is subject to different sources of noise, the most well-known being qubit decoherence, individual gate errors, and measurement errors. These errors limit the depth of the quantum circuit (i.e., the number of "layers" of quantum gates, executed in parallel, it takes to complete the computation defined by the quantum circuit) that can be implemented. However, even for shallow circuits, noise can lead to faulty estimates. Fortunately, quantum error mitigation provides a collection of tools and methods that allow one to evaluate accurate expectation values (probabilistic expected values of the quantum circuit) from noisy, shallow depth quantum circuits, even before the introduction of fault tolerance.

Quantum error mitigation refers to a series of techniques aimed at reducing (mitigating) the errors that occur in quantum computing algorithms. Such techniques involve running additional mitigation circuits or modified target circuits. As a result, the use of quantum error mitigation techniques generally results in longer execution times or requires access to additional qubits for increased accuracy.

An example of the former is probabilistic error cancellation where the noise of the target circuit is learned layer by layer and then cancelled in a probabilistic manner with an exponential overhead to control the subsequent spread in the variance of expectation values. An example of the latter is virtual distillation that requires high connectivity to "distill" multiple copies of the noisy quantum state into a pure one.

One of the most common methods for quantum error mitigation that involves running additional mitigation circuits is zero noise extrapolation. Zero noise extrapolation is an error mitigation technique used to extrapolate the noiseless expectation value (probabilistic expected value of the quantum circuit with zero noise) of an observable from a range of expectation values computed at different noise levels. For example, the noiseless expectation value (also referred to as the "zero-noise" value) is extrapolated by fitting a function (referred to as an "extrapolation function") to the expectation values of the mitigation circuits measured at different noise levels, where the noise has been tuned by noise factors (indicates the "noisiness" of the quantum circuit, such as difference noise levels) achieved by inserting additional digital quantum gates.

While a quantum error mitigation technique, such as zero noise extrapolation, is conceptionally straightforward, there are myriad subtleties in its practical application, including selecting the settings of the technique, such as noise factors and the extrapolation function. By not knowing a priori which settings to choose, it drastically slows down the workflow for noisy quantum computation by requiring multiple iterations to select such settings.

SUMMARY

In one embodiment of the present disclosure, a method for calibrating a quantum error mitigation technique with appropriate settings comprises saving calibrations of the quantum error mitigation technique corresponding to combinations of noise factors and extrapolation functions that when applied to quantum circuits achieve an expectation value that is close to a zero-noise value within a first threshold value. The method further comprises receiving a target quantum circuit. The method additionally comprises calibrating the quantum error mitigation technique based on selecting a calibration from the saved calibrations of the quantum error mitigation technique. Furthermore, the method comprises performing the calibrated quantum error mitigation technique on the target quantum circuit.

Additionally, in one embodiment of the present disclosure, the method further comprises generating the quantum circuits with varying depths to represent the target quantum circuit.

Furthermore, in one embodiment of the present disclosure, the method additionally comprises collecting expectation values for combinations of noise factors and extrapolation functions that are applied when executing the quantum circuits.

Additionally, in one embodiment of the present disclosure, the method further comprises computing an error in achieving the zero-noise value for different combinations of noise factors and extrapolation functions that are applied when executing the quantum circuits.

Furthermore, in one embodiment of the present disclosure, the saved calibrations of the quantum error mitigation technique correspond to those combinations of the noise factors and the extrapolation functions with a corresponding error in achieving the zero-noise value below a second threshold value.

Additionally, in one embodiment of the present disclosure, the method further comprises selecting the calibration of the saved calibrations of the quantum error mitigation technique based on a depth of the target quantum circuit.

Furthermore, in one embodiment of the present disclosure, the method additionally comprises calibrating the quantum error mitigation technique using calibrated parameters used to calibrate the quantum error mitigation technique performed on a different quantum circuit.

Other forms of the embodiments of the method described above are in a system and in a computer program product.

Accordingly, embodiments of the present disclosure automatically calibrate a quantum error mitigation technique (e.g., zero noise extrapolation) with the appropriate settings (e.g., noise factors, extrapolation function) to achieve a zero-noise value by the target quantum circuit without requiring multiple iterations.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which.

DETAILED DESCRIPTION

Figure 1:
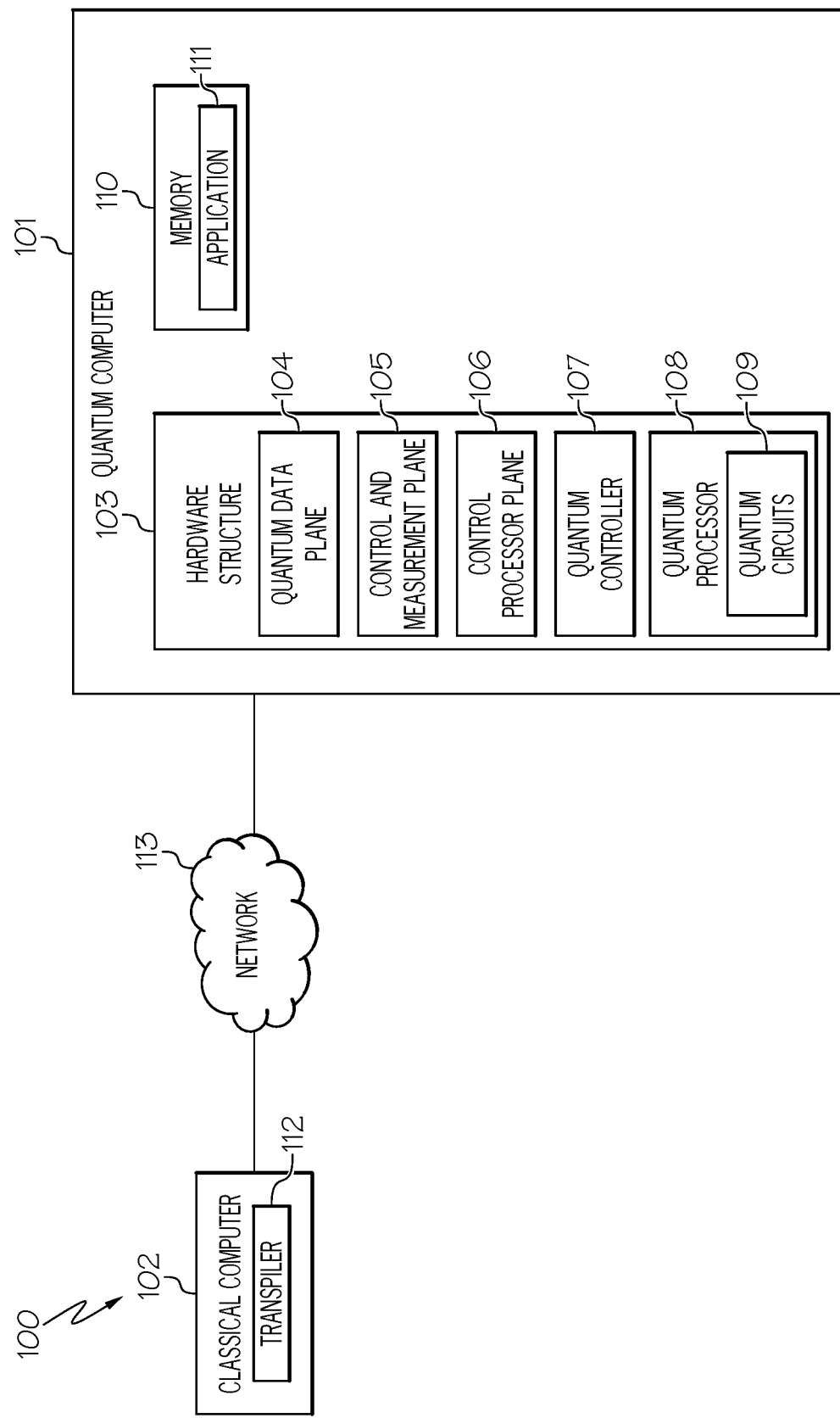
FIG. 1 illustrates a communication system for practicing the principles of the present disclosure in accordance with an embodiment of the present disclosure.

As stated in the Background section, quantum error mitigation refers to a series of techniques aimed at reducing (mitigating) the errors that occur in quantum computing algorithms. Such techniques involve running additional mitigation circuits or modified target circuits. As a result, the use of quantum error mitigation techniques generally results in longer execution times or requires access to additional qubits for increased accuracy.

An example of the former is probabilistic error cancellation where the noise of the target circuit is learned layer by layer and then cancelled in a probabilistic manner with an exponential overhead to control the subsequent spread in the variance of expectation values. An example of the latter is virtual distillation that requires high connectivity to "distill" multiple copies of the noisy quantum state into a pure one.

One of the most common methods for quantum error mitigation that involves running additional mitigation circuits is zero noise extrapolation. Zero noise extrapolation is an error mitigation technique used to extrapolate the noiseless expectation value (probabilistic expected value of the quantum circuit with zero noise) of an observable from a range of expectation values computed at different noise levels. For example, the noiseless expectation value (also referred to as the "zero-noise" value) is extrapolated by fitting a function (referred to as an "extrapolation function") to the expectation values of the mitigation circuits measured at different noise levels, where the noise has been tuned by noise factors (indicates the "noisiness" of the quantum circuit, such as difference noise levels) achieved by inserting additional digital quantum gates.

While a quantum error mitigation technique, such as zero noise extrapolation, is conceptionally straightforward, there are myriad subtleties in its practical application, including selecting the settings of the technique, such as noise factors and the extrapolation function. By not knowing a priori which settings to choose, it drastically slows down the workflow for noisy quantum computation by requiring multiple iterations to select such settings.

The embodiments of the present disclosure provide the means for automatically calibrating a quantum error mitigation technique (e.g., zero noise extrapolation) with the appropriate settings (e.g., noise factors, extrapolation function) to achieve a zero-noise value by the target quantum circuit without requiring multiple iterations based on collecting expectation values for different combinations of noise factors and extrapolation functions that are applied when executing quantum circuits of varying depths similar in structure to a target quantum circuit. Expectation values, as used herein, refer to the probabilistic expected values of the quantum circuit. Noise factors, as used herein, indicate the "noisiness" of the quantum circuit, such as different noise levels, which may be established via noise amplification. For example, in one embodiment, noise may be amplified digitally by folding each gate to reach a desired noise level. Extrapolation functions, as used herein, refer to the functions that are used to extrapolate or deduce the expectation value. A "structure" of a quantum circuit, as used herein, refers to a collection of quantum gates interconnected by quantum wires, including the number and the type of gates as well as the interconnection scheme. "Similarity of structure," as used herein, refers to a quantum circuit having a structure consisting of a collection of quantum gates, including the number and the type of gates as well as the interconnection scheme, within a threshold degree of similarity as the structure of another quantum circuit. The "depth" of the quantum circuit, as used herein, refers to the number of "layers" of quantum gates, executed in parallel, it takes to complete the computation defined by the quantum circuit. A "target quantum circuit," as used herein, refers to the quantum circuit upon which a quantum error mitigation technique is to be implemented, such as the zero noise extrapolation technique. Furthermore, calibrations, consisting of different combinations of noise factors and extrapolation functions along with the depth of the quantum circuit, are then saved for those quantum circuits that generate an expectation value that is close to the zero-noise value (also referred to as the "noiseless expectation value") within a threshold degree of accuracy. The "zero-noise value," as used herein, refers to the probabilistic expected value of the quantum circuit with zero noise. Upon receiving a target quantum circuit, a calibration, consisting of noise factors and an extrapolation function, is selected from the saved calibrations based on the depth of the target quantum circuit. For example, the selected calibration may correspond to the calibration with a depth corresponding to the depth of the target quantum circuit. The calibrated quantum error mitigation technique is then performed on the target quantum circuit. These and other features will be discussed in further detail below.

In some embodiments of the present disclosure, the present disclosure comprises a method, system and computer program product for calibrating a quantum error mitigation technique with appropriate settings. In one embodiment of the present disclosure, calibrations of the quantum error mitigation technique corresponding to combinations of noise factors and extrapolation functions that when applied to quantum circuits achieve an expectation value that is close to a zero-noise value within a threshold degree of accuracy are saved. In one embodiment, such quantum circuits correspond to quantum circuits of varying depths that represent the target quantum circuit. A calibration (combination of noise factors and an extrapolation function) is then selected from the saved calibrations based on the depth of the target quantum circuit. In one embodiment, such a calibration is selected among the saved calibrations based on matching the depth of the target quantum circuit with the depth of the quantum circuit associated with the calibration consisting of a combination of noise factors and an extrapolation function. The quantum error mitigation technique is then calibrated based on the selected calibration. The calibrated quantum error mitigation technique is then performed on the target quantum circuit. In this manner, a quantum error mitigation technique (e.g., zero noise extrapolation) is automatically calibrated with the appropriate settings (e.g., noise factors, extrapolation function) to achieve a zero-noise value by the target quantum circuit without requiring multiple iterations.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill the relevant art.

Referring now to the Figures in detail, FIG. 1 illustrates an embodiment of the present disclosure of a communication system 100 for practicing the principles of the present disclosure. Communication system 100 includes a quantum computer 101 configured to perform quantum computations, such as the types of computations that harness the collective properties of quantum states, such as superposition, interference, and entanglement, as well as a classical computer 102 in which information is stored in bits that are represented logically by either a 0 (off) or a 1 (on). Examples of classical computer 102 include, but not limited to, a portable computing unit, a Personal Digital Assistant (PDA), a laptop computer, a mobile device, a tablet personal computer, a smartphone, a mobile phone, a navigation device, a gaming unit, a desktop computer system, a workstation, and the like configured with the capability of connecting to network 113 (discussed below).

In one embodiment, classical computer 102 is used to setup the state of quantum bits in quantum computer 101 and then quantum computer 101 starts the quantum process. Furthermore, in one embodiment, classical computer 102 is configured to automatically calibrate a quantum error mitigation technique (e.g., zero noise extrapolation) with the appropriate settings (e.g., noise factors, extrapolation function) to achieve a zero-noise value by the target quantum circuit without requiring multiple iterations as discussed further below.

In one embodiment, a hardware structure 103 of quantum computer 101 includes a quantum data plane 104, a control and measurement plane 105, a control processor plane 106, a quantum controller 107 and a quantum processor 108. While depicted as being located on a single machine, quantum data plane 104, control and measurement plane 105, and control processor plane 106 may be distributed across multiple computing machines, such as in a cloud computing architecture, and communicate with quantum controller 107, which may be located in close proximity to quantum processor 108.

Quantum data plane 104 includes the physical qubits or quantum bits (basic unit of quantum information in which a qubit is a two-state (or two-level) quantum-mechanical system) and the structures needed to hold them in place. In one embodiment, quantum data plane 104 contains any support circuitry needed to measure the qubits' state and perform gate operations on the physical qubits for a gate-based system or control the Hamiltonian for an analog computer. In one embodiment, control signals routed to the selected qubit(s) set a state of the Hamiltonian. For gate-based systems, since some qubit operations require two qubits, quantum data plane 104 provides a programmable "wiring" network that enables two or more qubits to interact.

Control and measurement plane 105 converts the digital signals of quantum controller 107, which indicates what quantum operations are to be performed, to the analog control signals needed to perform the operations on the qubits in quantum data plane 104. In one embodiment, control and measurement plane 105 converts the analog output of the measurements of qubits in quantum data plane 104 to classical binary data that quantum controller 107 can handle.

Control processor plane 106 identifies and triggers the sequence of quantum gate operations and measurements (which are subsequently carried out by control and measurement plane 105 on quantum data plane 104). These sequences execute the program, provided by quantum processor 108, for implementing a quantum algorithm.

In one embodiment, control processor plane 106 runs the quantum error correction algorithm (if quantum computer 101 is error corrected).

In one embodiment, quantum processor 108 uses qubits to perform computational tasks. In the particular realms where quantum mechanics operate, particles of matter can exist in multiple states, such as an "on" state, an "off" state and both "on" and "off" states simultaneously. Quantum processor 108 harnesses these quantum states of matter to output signals that are usable in data computing.

In one embodiment, quantum processor 108 performs algorithms which conventional processors are incapable of performing efficiently.

In one embodiment, quantum processor 108 includes one or more quantum circuits 109. Quantum circuits 109 may collectively or individually be referred to as quantum circuits 109 or quantum circuit 109, respectively. A "quantum circuit 109," as used herein, refers to a model for quantum computation in which a computation is a sequence of quantum logic gates, measurements, initializations of qubits to known values and possibly other actions. A "quantum logic gate," as used herein, is a reversible unitary transformation on at least one qubit. Quantum logic gates, in contrast to classical logic gate, are all reversible. Examples of quantum logic gates include RX (performs $e^{i\theta X}$, which corresponds to a rotation of the qubit state around the X-axis by the given angle theta θ on the Bloch sphere), RY (performs $e^{i\theta Y}$, which corresponds to a rotation of the qubit state around the Y-axis by the given angle theta θ on the Bloch sphere), RXX (performs the operation $e^{(-i\theta X \otimes X/2)}$ on the input qubit), RZZ (takes in one input, an angle theta θ expressed in radians, and it acts on two qubits), etc. In one embodiment, quantum circuits 109 are written such that the horizontal axis is time, starting at the left-hand side and ending at the right-hand side.

Furthermore, in one embodiment, quantum circuit 109 corresponds to a command structure provided to control processor plane 106 on how to operate control and measurement plane 105 to run the algorithm on quantum data plane 104/quantum processor 108.

Furthermore, quantum computer 101 includes memory 110, which may correspond to quantum memory. In one embodiment, memory 110 is a set of quantum bits that store quantum states for later retrieval. The state stored in quantum memory 110 can retain quantum superposition.

In one embodiment, memory 110 stores an application 111 that may be configured to implement one or more of the methods described herein in accordance with one or more embodiments. For example, application 111 may implement a program for automatically calibrating a quantum error mitigation technique (e.g., zero noise extrapolation) with the appropriate settings (e.g., noise factors, extrapolation function) to achieve a zero-noise value by the target quantum circuit without requiring multiple iterations as discussed further below in connection with FIGS. 2 and 4. Examples of memory 110 include light quantum memory, solid quantum memory, gradient echo memory, electromagnetically induced transparency, etc.

Furthermore, in one embodiment, classical computer 102 includes a "transpiler 112," which as used herein, is configured to rewrite an abstract quantum circuit 109 into a functionally equivalent one that matches the constraints and characteristics of a specific target quantum device. In one embodiment, transpiler 112 (e.g., qiskit.transpiler, where Qiskit® is an open-source software development kit for working with quantum computers at the level of circuits, pulses, and algorithms) converts the trained machine learning model upon execution on quantum hardware 103 to its elementary instructions and maps it to physical qubits.

In one embodiment, quantum machine learning models are based on variational quantum circuits 109. Such models consist of data encoding, processing parameterized with trainable parameters and measurement/post-processing.

In one embodiment, the number of qubits (basic unit of quantum information in which a qubit is a two-state (or two-level) quantum-mechanical system) is determined by the number of features in the data. This processing stage may include multiple layers of parameterized gates. As a result, in one embodiment, the number of trainable parameters is (number of features)*(number of layers).

Furthermore, as shown in FIG. 1, classical computer 102, which is used to setup the state of quantum bits in quantum computer 101, may be connected to quantum computer 101 via a network 113.

Network 113 may be, for example, a quantum network, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, a cellular network and various combinations thereof, etc. Other networks, whose descriptions are omitted here for brevity, may also be used in conjunction with system 100 of FIG. 1 without departing from the scope of the present disclosure.

Furthermore, classical computer 102 is configured to automatically calibrate a quantum error mitigation technique (e.g., zero noise extrapolation) with the appropriate settings (e.g., noise factors, extrapolation function) to achieve a zero-noise value by the target quantum circuit without requiring multiple iterations as discussed further below in connection with FIGS. 2 and 4. A description of the software components of classical computer 102 is provided below in connection with FIG. 2 and a description of the hardware configuration of classical computer 102 is provided further below in connection with FIG. 3.

System 100 is not to be limited in scope to any one particular network architecture. System 100 may include any number of quantum computers 101, classical computers 102 and networks 113.

A discussion regarding the software components used by classical computer 102 for automatically calibrating a quantum error mitigation technique (e.g., zero noise extrapolation) with the appropriate settings (e.g., noise factors, extrapolation function) to achieve a zero-noise value by the target quantum circuit without requiring multiple iterations is provided below in connection with FIG. 2.

Figure 2:
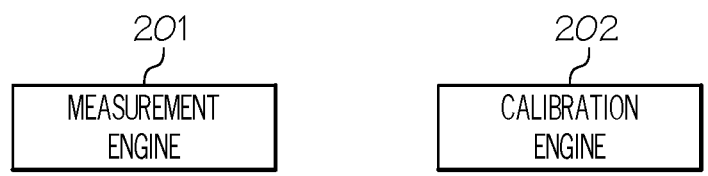
FIG. 2 is a diagram of the software components of the classical system for automatically calibrating a quantum error mitigation technique with the appropriate settings to achieve a zero-noise value by the target quantum circuit without requiring multiple iterations in accordance with an embodiment of the present disclosure.

FIG. 2 is a diagram of the software components of classical system 102 (FIG. 1) for automatically calibrating a quantum error mitigation technique (e.g., zero noise extrapolation) with the appropriate settings (e.g., noise factors, extrapolation function) to achieve a zero-noise value by the target quantum circuit without requiring multiple iterations in accordance with an embodiment of the present disclosure.

Referring to FIG. 2, in conjunction with FIG. 1, classical computer 102 includes a measurement engine 201 configured to generate quantum circuits with varying depths to represent the target quantum circuit. In one embodiment, such quantum circuits are similar in structure to the target quantum circuit.

A "structure" of a quantum circuit, as used herein, refers to a collection of quantum gates interconnected by quantum wires, including the number and the type of gates as well as the interconnection scheme. "Similarity of structure," as used herein, refers to a quantum circuit having a structure consisting of a collection of quantum gates, including the number and the type of gates as well as the interconnection scheme, within a threshold degree of similarity, which may be user-designated, as the structure of another quantum circuit. The "depth" of the quantum circuit, as used herein, refers to the number of "layers" of quantum gates, executed in parallel, it takes to complete the computation defined by the quantum circuit. A "target quantum circuit," as used herein, refers to the quantum circuit upon which a quantum error mitigation technique is to be implemented, such as the zero noise extrapolation technique.

In one embodiment, a user inputs the structure of the target quantum circuit in classical computer 102, such as via a graphical user interface. For example, the user may input the number and the type of gates as well as the interconnection scheme. In one embodiment, measurement engine 201 generates various quantum circuits with varying depths with a structure similar to the target quantum circuit within a threshold degree of similarity, which may be user-designated. For instance, if the target quantum circuit consisted of two Pauli transformation gates, two Hadamard gates, a single CNOT gate, a single SWAP gate and a single Toffoli gate with a specified interconnection scheme, then measurement engine 201 generates various quantum circuits with varying depths with a structure (e.g., two Pauli transformation gates, two Hadamard gates, a single CNOT gate, a single SWAP gate and a single Toffoli gate) similar to the target quantum circuit (e.g., two Pauli transformation gates, two Hadamard gates, a single CNOT gate, a single SWAP gate and a single Toffoli gate) within a threshold degree of similarity. In one embodiment, the threshold degree of similarity is user-designated. For example, the threshold degree of similarity may correspond to having a threshold amount (e.g., 90%) of the same quantum gates as the target quantum circuit.

In one embodiment, measurement engine 201 generates various quantum circuits with varying depths with a structure similar to the target quantum circuit within a threshold degree of similarity using various software tools, including, but not limited to, Cirq®, Qiskit®, QCircuits, Yao, Qulacs®, staq, etc.

Measurement engine 201 is further configured to collect expectation values for different combinations of noise factors and extrapolation functions that are applied when executing the quantum circuits that represent the target quantum circuit, such as being similar in structure to the target quantum circuit.

Noise factors, as used herein, indicate the "noisiness" of the quantum circuit, such as different noise levels, which may be established via noise amplification (digital or analog). In one embodiment, the noise level of a quantum circuit at the gate level is amplified (increased) by intentionally increasing its depth, which can be obtained using either unitary folding or identity scaling. For example, in one embodiment, noise may be amplified digitally by folding each gate to reach a desired noise level.

In one embodiment, the noise factors (different levels of noise) may be established by a user of classical computer 102 inputting such noise factors in classical computer 102, such as via a graphical user interface. For instance, noise factors 1, 3 and 5 may be utilized during an execution of the quantum circuit followed by utilizing noise factors 1, 1.1 and 1.2 during a subsequent execution of the quantum circuit using noise amplification.

Extrapolation functions, as used herein, refer to the functions that are used to extrapolate or deduce the expectation value. Examples of extrapolation functions include, but not limited to, a linear function, a polynomial and an exponential. In one embodiment, the extrapolation functions to be utilized when executing the quantum circuits are provided by a user of classical computer 102, such as via a graphical user interface.

As discussed above, the expectation values correspond to the probabilistic expected values of the quantum circuit. In one embodiment, such expectation values are collected by measurement engine 201 for different noise factors and extrapolation functions that are applied when executing the quantum circuits that are similar in structure to the target quantum circuit within a threshold degree of similarity using various software tools, including, but not limited to, Cirq®, Qiskit®, QCircuits, Yao, Qulacs®, staq, etc.

Furthermore, in one embodiment, measurement engine 201 computes an error in achieving the zero-noise value (also referred to as the "noiseless expectation value") for different combinations of noise factors and extrapolation functions. In one embodiment, such an error is computed based on the difference between the expectation value obtained using a combination of noise factors and an extrapolation function (previously collected) and the zero-noise value, which corresponds to the probabilistic expected value of the quantum circuit with zero noise.

In one embodiment, the zero-noise value is determined by fitting a function ( ) to the measured noise-scaled expectation values (collected expectation values) thereby obtaining an optimal set of parameters, $p_1, p_2, \ldots p_m$, where m is equal to the number of data points in the fit (i.e., the number of noise-scaled expectation values). The corresponding zero-noise limit is then evaluated using the function ($f$) and optimal set of parameters.

In one embodiment, the zero-noise value is previously known, such as being provided by an expert, such as via a graphical user interface of classical computer 102.

In one embodiment, measurement engine 201 computes such an error in the manner discussed above using various software tools, including, but not limited to, Kfits, OriginLab®, Igor Pro®, etc.

Classical computer 102 further includes a calibration engine 202 configured to save those combinations of noise factors and extrapolation functions ("calibrations") with a corresponding error in achieving the zero-noise value below a threshold value. Such calibrations correspond to the calibrations of the quantum error mitigation technique (e.g., zero noise extrapolation). In one embodiment, such calibrations (noise factors and extrapolation functions) have an error below a threshold value, which may be user-specified. That is, such calibrations (noise factors and extrapolation functions) achieve an expectation value that is close to the zero-noise value within a threshold degree of accuracy, which may be user-specified.

In one embodiment, calibration engine 202 saves such calibrations (combinations of noise factors and extrapolation functions) with a corresponding error in achieving the zero-noise value below a threshold value in a storage device of classical computer 102.

In one embodiment, such saved calibrations also include the depth of the corresponding executed quantum circuit that generated the expectation value that was close to the zero-noise value within a threshold degree of accuracy using the combination of noise factors and an extrapolation function.

Furthermore, in one embodiment, calibration engine 202 is configured to receive a target quantum circuit to be evaluated using the calibrated quantum error mitigation technique, such as from the user of classical computer 102.

In one embodiment, calibration engine 202 receives the target quantum circuit to be evaluated using the calibrated quantum error mitigation technique based on a user inputting the structure of the target quantum circuit in classical computer 102, such as via a graphical user interface. For example, the user may input the number and the type of gates, the interconnection scheme as well as the depth of the target quantum circuit. As discussed above, the "depth" of the quantum circuit corresponds to the number of "layers" of quantum gates, executed in parallel, it takes to complete the computation defined by the quantum circuit.

In one embodiment, the structure of the target quantum circuit, including the depth of the target quantum circuit, may have been previously provided by the user to measurement engine 201, which then provides such information to calibration engine 202.

In one embodiment, calibration engine 202 is further configured to select a calibration from the saved calibrations of the quantum error mitigation technique based on the depth of the target quantum circuit. As previously discussed, measurement engine 201 generates quantum circuits with a similar structure to the target quantum circuit with varying depths. The expectation values for such quantum circuits with varying depths are then collected for different combinations of noise factors and extrapolation functions. For those quantum circuits that achieve an expectation value using a combination of noise factors and an extrapolation function that is close to the zero-noise value within a threshold degree of accuracy, which may be user-specified, such a combination of noise factors and an extrapolation function, along with the depth of the quantum circuit, is saved as a calibration. In one embodiment, calibration engine 202 identifies such a calibration among the saved calibrations based on matching the depth of the target quantum circuit with the depth of the quantum circuit associated with the calibration consisting of a combination of noise factors and an extrapolation function. In this manner, the appropriate calibration (combination of noise factors and an extrapolation function) may be selected to calibrate the quantum error mitigation technique (e.g., zero noise extrapolation) to be performed on the target quantum circuit to reduce (mitigate) the errors that occur in quantum computing algorithms.

Furthermore, in one embodiment, calibration engine 202 calibrates the quantum error mitigation technique (e.g., zero noise extrapolation) based on the selected calibration (e.g., noise factors and extrapolation function). In one embodiment, calibration engine 202 calibrates the quantum error mitigation technique (e.g., zero noise extrapolation) based on the selected calibration (e.g., noise factors and extrapolation function) by selecting the settings for the quantum error mitigation technique to correspond to the noise factors and extrapolation function of the selected calibration. In this manner, the appropriate calibration (combination of noise factors and an extrapolation function) or settings are performed on the quantum error mitigation technique (e.g., zero noise extrapolation) without multiple iterations.

In one embodiment, calibration engine 202 is further configured to perform the calibrated quantum error mitigation technique on the target quantum circuit.

In one embodiment, calibration engine 202 is configured to select the calibration, calibrate the quantum error mitigation technique based on the selected calibration and perform the calibrated quantum error mitigation technique on the target quantum circuit using various software tools, including, but not limited to, Mitiq, Cirq®, Qiskit®, QCircuits, Yao, Qulacs®, staq, etc.

In one embodiment, in situations in which quantum circuits are structurally similar to the target quantum circuit within a threshold degree of similarity, which may be user-designated, and the quantum error mitigation technique performed on such quantum circuits has been previously calibrated, such calibrated parameters may be retrieved by calibration engine 202 to calibrate the quantum error mitigation technique (e.g., zero noise extrapolation) to be utilized on the target quantum circuit. Upon calibrating the quantum error mitigation technique, calibration engine 202 performs the calibrated quantum error mitigation technique on the target quantum circuit. As discussed above, "similarity of structure," as used herein, refers to a quantum circuit having a structure consisting of a collection of quantum gates, including the number and type of gates as well as the interconnection scheme, within a threshold degree of similarity as the structure of another quantum circuit, such as the target quantum circuit. In one embodiment, the threshold degree of similarity is user-designated. In one embodiment, calibration engine 202 determines the structural similarity between quantum circuits, including a previously calibrated quantum circuit and the target quantum circuit, using various software tools, including, but not limited to, Cirq®, Qiskit®, QCircuits, Yao, Qulacs®, staq, etc.

A further description of these and other functions is provided below in connection with the discussion of the method for calibrating a quantum error mitigation technique (e.g., zero noise extrapolation) with the best settings to achieve a zero-noise value by the target quantum circuit without requiring multiple iterations.

Prior to the discussion of the method for calibrating a quantum error mitigation technique (e.g., zero noise extrapolation) with the best settings to achieve a zero-noise value by the target quantum circuit without requiring multiple iterations, a description of the hardware configuration of classical computer 102 (FIG. 1) is provided below in connection with FIG. 3.

Figure 3:
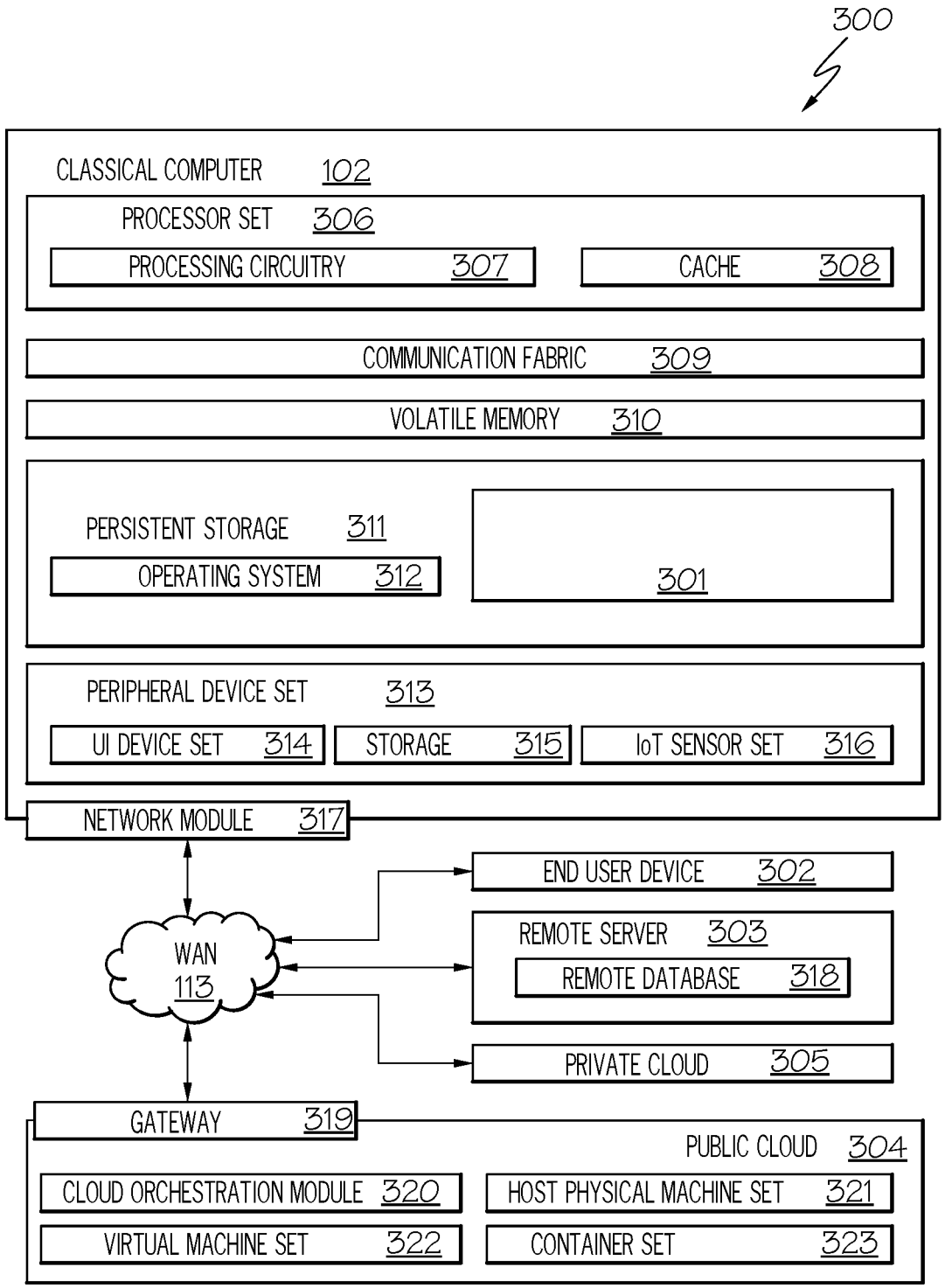
FIG. 3 illustrates an embodiment of the present disclosure of the hardware configuration of the classical computer which is representative of a hardware environment for practicing the present disclosure.

Referring now to FIG. 3, in conjunction with FIG. 1, FIG. 3 illustrates an embodiment of the present disclosure of the hardware configuration of classical computer 102 which is representative of a hardware environment for practicing the present disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 300 contains an example of an environment for the execution of at least some of the computer code 301 involved in performing the inventive methods, such as calibrating a quantum error mitigation technique (e.g., zero noise extrapolation) with the best settings to achieve a zero-noise value by the target quantum circuit without requiring multiple iterations. In addition to block 301, computing environment 300 includes, for example, classical computer 102, network 113, such as a wide area network (WAN), end user device (EUD) 302, remote server 303, public cloud 304, and private cloud 305. In this embodiment, classical computer 102 includes processor set 306 (including processing circuitry 307 and cache 308), communication fabric 309, volatile memory 310, persistent storage 311 (including operating system 312 and block 301, as identified above), peripheral device set 313 (including user interface (UI) device set 314, storage 315, and Internet of Things (IoT) sensor set 316), and network module 317. Remote server 303 includes remote database 318. Public cloud 304 includes gateway 319, cloud orchestration module 320, host physical machine set 321, virtual machine set 322, and container set 323.

Classical computer 102 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 318. As is well understood in the art of computer technology, and depending upon the technology, performance of a computer-implemented method may be distributed among multiple computers and/or between multiple locations. On the other hand, in this presentation of computing environment 300, detailed discussion is focused on a single computer, specifically classical computer 102, to keep the presentation as simple as possible. Classical computer 102 may be located in a cloud, even though it is not shown in a cloud in FIG. 3. On the other hand, classical computer 102 is not required to be in a cloud except to any extent as may be affirmatively indicated.

Processor set 306 includes one, or more, computer processors of any type now known or to be developed in the future. Processing circuitry 307 may be distributed over multiple packages, for example, multiple, coordinated integrated circuit chips. Processing circuitry 307 may implement multiple processor threads and/or multiple processor cores. Cache 308 is memory that is located in the processor chip package(s) and is typically used for data or code that should be available for rapid access by the threads or cores running on processor set 306. Cache memories are typically organized into multiple levels depending upon relative proximity to the processing circuitry. Alternatively, some, or all, of the cache for the processor set may be located "off chip." In some computing environments, processor set 306 may be designed for working with qubits and performing quantum computing.

Computer readable program instructions are typically loaded onto classical computer 102 to cause a series of operational steps to be performed by processor set 306 of classical computer 102 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 308 and the other storage media discussed below. The program instructions, and associated data, are accessed by processor set 306 to control and direct performance of the inventive methods. In computing environment 300, at least some of the instructions for performing the inventive methods may be stored in block 301 in persistent storage 311.

Communication fabric 309 is the signal conduction paths that allow the various components of classical computer 102 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 310 is any type of volatile memory now known or to be developed in the future. Examples include dynamic type random access memory (RAM) or static type RAM. Typically, the volatile memory is characterized by random access, but this is not required unless affirmatively indicated. In classical computer 102, the volatile memory 310 is located in a single package and is internal to classical computer 102, but, alternatively or additionally, the volatile memory may be distributed over multiple packages and/or located externally with respect to classical computer 102.

Persistent Storage 311 is any form of non-volatile storage for computers that is now known or to be developed in the future. The non-volatility of this storage means that the stored data is maintained regardless of whether power is being supplied to classical computer 102 and/or directly to persistent storage 311. Persistent storage 311 may be a read only memory (ROM), but typically at least a portion of the persistent storage allows writing of data, deletion of data and re-writing of data. Some familiar forms of persistent storage include magnetic disks and solid state storage devices. Operating system 312 may take several forms, such as various known proprietary operating systems or open source Portable Operating System Interface type operating systems that employ a kernel. The code included in block 301 typically includes at least some of the computer code involved in performing the inventive methods.

Peripheral device set 313 includes the set of peripheral devices of classical computer 102. Data communication connections between the peripheral devices and the other components of classical computer 102 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 314 may include components such as a display screen, speaker, microphone, wearable devices (such as goggles and smart watches), keyboard, mouse, printer, touchpad, game controllers, and haptic devices. Storage 315 is external storage, such as an external hard drive, or insertable storage, such as an SD card. Storage 315 may be persistent and/or volatile. In some embodiments, storage 315 may take the form of a quantum computing storage device for storing data in the form of qubits. In embodiments where classical computer 102 is required to have a large amount of storage (for example, where classical computer 102 locally stores and manages a large database) then this storage may be provided by peripheral storage devices designed for storing very large amounts of data, such as a storage area network (SAN) that is shared by multiple, geographically distributed computers. IoT sensor set 316 is made up of sensors that can be used in Internet of Things applications. For example, one sensor may be a thermometer and another sensor may be a motion detector.

Network module 317 is the collection of computer software, hardware, and firmware that allows classical computer 102 to communicate with other computers through WAN 113. Network module 317 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 317 are performed on the same physical hardware device. In other embodiments (for example, embodiments that utilize software-defined networking (SDN)), the control functions and the forwarding functions of network module 317 are performed on physically separate devices, such that the control functions manage several different network hardware devices. Computer readable program instructions for performing the inventive methods can typically be downloaded to classical computer 102 from an external computer or external storage device through a network adapter card or network interface included in network module 317.

WAN 113 is any wide area network (for example, the internet) capable of communicating computer data over non-local distances by any technology for communicating computer data, now known or to be developed in the future.

In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 302 is any computer system that is used and controlled by an end user (for example, a customer of an enterprise that operates classical computer 102), and may take any of the forms discussed above in connection with classical computer 102. EUD 302 typically receives helpful and useful data from the operations of classical computer 102. For example, in a hypothetical case where classical computer 102 is designed to provide a recommendation to an end user, this recommendation would typically be communicated from network module 317 of classical computer 102 through WAN 113 to EUD 302. In this way, EUD 302 can display, or otherwise present, the recommendation to an end user. In some embodiments, EUD 302 may be a client device, such as thin client, heavy client, mainframe computer, desktop computer and so on.

Remote server 303 is any computer system that serves at least some data and/or functionality to classical computer 102. Remote server 303 may be controlled and used by the same entity that operates classical computer 102. Remote server 303 represents the machine(s) that collect and store helpful and useful data for use by other computers, such as classical computer 102. For example, in a hypothetical case where classical computer 102 is designed and programmed to provide a recommendation based on historical data, then this historical data may be provided to classical computer 102 from remote database 318 of remote server 303.

Public cloud 304 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 304 is performed by the computer hardware and/or software of cloud orchestration module 320. The computing resources provided by public cloud 304 are typically implemented by virtual computing environments that run on various computers making up the computers of host physical machine set 321, which is the universe of physical computers in and/or available to public cloud 304. The virtual computing environments (VCEs) typically take the form of virtual machines from virtual machine set 322 and/or containers from container set 323. It is understood that these VCEs may be stored as images and may be transferred among and between the various physical machine hosts, either as images or after instantiation of the VCE. Cloud orchestration module 320 manages the transfer and storage of images, deploys new instantiations of VCEs and manages active instantiations of VCE deployments. Gateway 319 is the collection of computer software, hardware, and firmware that allows public cloud 304 to communicate through WAN 113.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 305 is similar to public cloud 304, except that the computing resources are only available for use by a single enterprise. While private cloud 305 is depicted as being in communication with WAN 113 in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 304 and private cloud 305 are both part of a larger hybrid cloud.

Block 301 further includes the software components discussed above in connection with FIG. 2 to calibrate a quantum error mitigation technique (e.g., zero noise extrapolation) with the best settings to achieve a zero-noise value by the target quantum circuit without requiring multiple iterations. In one embodiment, such components may be implemented in hardware. The functions discussed above performed by such components are not generic computer functions. As a result, classical computer 102 is a particular machine that is the result of implementing specific, non-generic computer functions.

In one embodiment, the functionality of such software components of classical computer 102, including the functionality for calibrating a quantum error mitigation technique (e.g., zero noise extrapolation) with the best settings to achieve a zero-noise value by the target quantum circuit without requiring multiple iterations, may be embodied in an application specific integrated circuit.

As stated above, quantum error mitigation refers to a series of techniques aimed at reducing (mitigating) the errors that occur in quantum computing algorithms. Such techniques involve running additional mitigation circuits or modified target circuits. As a result, the use of quantum error mitigation techniques generally results in longer execution times or requires access to additional qubits for increased accuracy. An example of the former is probabilistic error cancellation where the noise of the target circuit is learned layer by layer and then cancelled in a probabilistic manner with an exponential overhead to control the subsequent spread in the variance of expectation values. An example of the latter is virtual distillation that requires high connectivity to "distill" multiple copies of the noisy quantum state into a pure one. One of the most common methods for quantum error mitigation that involves running additional mitigation circuits is zero noise extrapolation. Zero noise extrapolation is an error mitigation technique used to extrapolate the noiseless expectation value (probabilistic expected value of the quantum circuit with zero noise) of an observable from a range of expectation values computed at different noise levels. For example, the noiseless expectation value (also referred to as the "zero-noise" value) is extrapolated by fitting a function (referred to as an "extrapolation function") to the expectation values of the mitigation circuits measured at different noise levels, where the noise has been tuned by noise factors (indicates the "noisiness" of the quantum circuit, such as difference noise levels) achieved by inserting additional digital quantum gates. While a quantum error mitigation technique, such as zero noise extrapolation, is conceptionally straightforward, there are myriad subtleties in its practical application, including selecting the settings of the technique, such as noise factors and the extrapolation function. By not knowing apriori which settings to choose, it drastically slows down the workflow for noisy quantum computation by requiring multiple iterations to select such settings.

The embodiments of the present disclosure provide the means for automatically calibrating a quantum error mitigation technique (e.g., zero noise extrapolation) with the appropriate settings (e.g., noise factors, extrapolation function) to achieve a zero-noise value by the target quantum circuit without requiring multiple iterations as discussed below in connection with FIG. 4.

Figure 4:
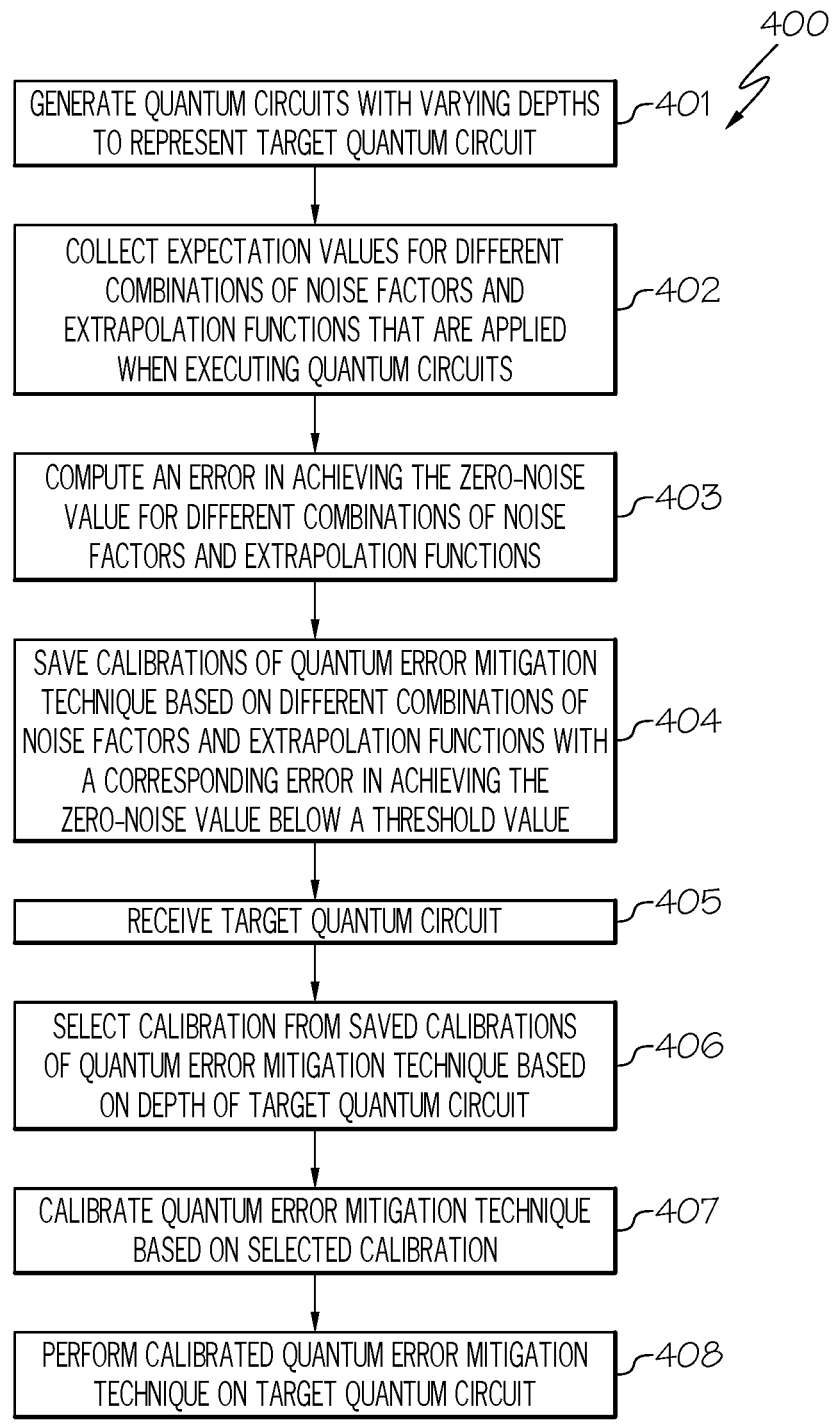
FIG. 4 is a flowchart of a method for automatically calibrating a quantum error mitigation technique with the appropriate settings to achieve a zero-noise value by the target quantum circuit without requiring multiple iterations in accordance with an embodiment of the present disclosure.

FIG. 4 is a flowchart of a method 400 for automatically calibrating a quantum error mitigation technique (e.g., zero noise extrapolation) with the appropriate settings (e.g., noise factors, extrapolation function) to achieve a zero-noise value by the target quantum circuit without requiring multiple iterations in accordance with an embodiment of the present disclosure.

Referring to FIG. 4, in conjunction with FIGS. 1-3, in step 401, measurement engine 201 of classical computer 102 generates quantum circuits with varying depths to represent the target quantum circuit. In one embodiment, such quantum circuits are similar in structure to the target quantum circuit.

As discussed above, a "structure" of a quantum circuit, as used herein, refers to a collection of quantum gates interconnected by quantum wires, including the number and the type of gates as well as the interconnection scheme. "Similarity of structure," as used herein, refers to a quantum circuit having a structure consisting of a collection of quantum gates, including the number and the type of gates as well as the interconnection scheme, within a threshold degree of similarity, which may be user-designated, as the structure of another quantum circuit. The "depth" of the quantum circuit, as used herein, refers to the number of "layers" of quantum gates, executed in parallel, it takes to complete the computation defined by the quantum circuit. A "target quantum circuit," as used herein, refers to the quantum circuit upon which a quantum error mitigation technique is to be implemented, such as the zero noise extrapolation technique.

In one embodiment, a user inputs the structure of the target quantum circuit in classical computer 102, such as via a graphical user interface. For example, the user may input the number and the type of gates as well as the interconnection scheme. In one embodiment, measurement engine 201 generates various quantum circuits with varying depths with a structure similar to the target quantum circuit within a threshold degree of similarity, which may be user-designated. For instance, if the target quantum circuit consisted of two Pauli transformation gates, two Hadamard gates, a single CNOT gate, a single SWAP gate and a single Toffoli gate with a specified interconnection scheme, then measurement engine 201 generates various quantum circuits with varying depths with a structure (e.g., two Pauli transformation gates, two Hadamard gates, a single CNOT gate, a single SWAP gate and a single Toffoli gate) similar to the target quantum circuit (e.g., two Pauli transformation gates, two Hadamard gates, a single CNOT gate, a single SWAP gate and a single Toffoli gate) within a threshold degree of similarity. In one embodiment, the threshold degree of similarity is user-designated. For example, the threshold degree of similarity may correspond to having a threshold amount (e.g., 90%) of the same quantum gates as the target quantum circuit.

In one embodiment, measurement engine 201 generates various quantum circuits with varying depths with a structure similar to the target quantum circuit within a threshold degree of similarity using various software tools, including, but not limited to, Cirq®, Qiskit®, QCircuits, Yao, Qulacs®, staq, etc.

In step 402, measurement engine 201 of classical computer 102 collects expectation values for different combinations of noise factors and extrapolation functions that are applied when executing the quantum circuits that represent the target quantum circuit, such as being similar in structure to the target quantum circuit.

As stated above, noise factors, as used herein, indicate the "noisiness" of the quantum circuit, such as different noise levels, which may be established via noise amplification (digital or analog). In one embodiment, the noise level of a quantum circuit at the gate level is amplified (increased) by intentionally increasing its depth, which can be obtained using either unitary folding or identity scaling. For example, in one embodiment, noise may be amplified digitally by folding each gate to reach a desired noise level.

In one embodiment, the noise factors (different levels of noise) may be established by a user of classical computer 102 inputting such noise factors in classical computer 102, such as via a graphical user interface. For instance, noise factors 1, 3 and 5 may be utilized during an execution of the quantum circuit followed by utilizing noise factors 1, 1.1 and 1.2 during a subsequent execution of the quantum circuit using noise amplification.

Extrapolation functions, as used herein, refer to the functions that are used to extrapolate or deduce the expectation value. Examples of extrapolation functions include, but not limited to, a linear function, a polynomial and an exponential. In one embodiment, the extrapolation functions to be utilized when executing the quantum circuits are provided by a user of classical computer 102, such as via a graphical user interface.

Furthermore, as discussed above, the expectation values correspond to the probabilistic expected values of the quantum circuit. In one embodiment, such expectation values are collected by measurement engine 201 for different noise factors and extrapolation functions that are applied when executing the quantum circuits that are similar in structure to the target quantum circuit within a threshold degree of similarity using various software tools, including, but not limited to, Cirq®, Qiskit®, QCircuits, Yao, Qulacs®, staq, etc.

In step 403, measurement engine 201 of classical computer 102 computes an error in achieving the zero-noise value (also referred to as the "noiseless expectation value") for different combinations of noise factors and extrapolation functions.

As discussed above, in one embodiment, such an error is computed based on the difference between the expectation value obtained using a combination of noise factors and an extrapolation function (previously collected) and the zero-noise value, which corresponds to the probabilistic expected value of the quantum circuit with zero noise.

In one embodiment, the zero-noise value is determined by fitting a function (f) to the measured noise-scaled expectation values (collected expectation values) thereby obtaining an optimal set of parameters, $p_1, p_2, \ldots p_m$, where m is equal to the number of data points in the fit (i.e., the number of noise-scaled expectation values). The corresponding zero-noise limit is then evaluated using the function (f) and optimal set of parameters.

In one embodiment, the zero-noise value is previously known, such as being provided by an expert, such as via a graphical user interface of classical computer 102.

In one embodiment, measurement engine 201 computes such an error in the manner discussed above using various software tools, including, but not limited to, Kfits, OriginLab®, Igor Pro®, etc.

In step 404, calibration engine 202 of classical computer 102 saves the calibrations of a quantum error mitigation technique (e.g., zero noise extrapolation) based on different combinations of noise factors and extrapolation functions ("calibrations") with a corresponding error in achieving the zero-noise value below a threshold value.

As stated above, in one embodiment, such calibrations (noise factors and extrapolation functions) have an error below a threshold value, which may be user-specified. That is, such calibrations (noise factors and extrapolation functions) achieve an expectation value that is close to the zero-noise value within a threshold degree of accuracy, which may be user-specified.

In one embodiment, calibration engine 202 saves such calibrations (combinations of noise factors and extrapolation functions) with a corresponding error in achieving the zero-noise value below a threshold value in a storage device (e.g., storage device 311, 315) of classical computer 102.

In one embodiment, such saved calibrations also include the depth of the corresponding executed quantum circuit that generated the expectation value that was close to the zero-noise value within a threshold degree of accuracy using the combination of noise factors and an extrapolation function.

In step 405, calibration engine 202 of classical computer 102 receives a target quantum circuit to be evaluated using the calibrated quantum error mitigation technique, such as from the user of classical computer 102.

As discussed above, in one embodiment, calibration engine 202 receives the target quantum circuit to be evaluated using the calibrated quantum error mitigation technique based on a user inputting the structure of the target quantum circuit in classical computer 102, such as via a graphical user interface. For example, the user may input the number and the type of gates, the interconnection scheme as well as the depth of the target quantum circuit. As discussed above, the "depth" of the quantum circuit corresponds to the number of "layers" of quantum gates, executed in parallel, it takes to complete the computation defined by the quantum circuit.

In one embodiment, the structure of the target quantum circuit, including the depth of the target quantum circuit, may have been previously provided by the user to measurement engine 201, which then provides such information to calibration engine 202.

In step 406, calibration engine 202 of classical computer 102 selects a calibration from the saved calibrations of the quantum error mitigation technique based on the depth of the target quantum circuit.

As previously discussed, measurement engine 201 generates quantum circuits with a similar structure to the target quantum circuit with varying depths. The expectation values for such quantum circuits with varying depths are then collected for different combinations of noise factors and extrapolation functions. For those quantum circuits that achieve an expectation value using a combination of noise factors and an extrapolation function that is close to the zero-noise value within a threshold degree of accuracy, which may be user-specified, such a combination of noise factors and an extrapolation function, along with the depth of the quantum circuit, is saved as a calibration. In one embodiment, calibration engine 202 identifies such a calibration among the saved calibrations based on matching the depth of the target quantum circuit with the depth of the quantum circuit associated with the calibration consisting of a combination of noise factors and an extrapolation function. In this manner, the appropriate calibration (combination of noise factors and an extrapolation function) may be selected to calibrate the quantum error mitigation technique (e.g., zero noise extrapolation) to be performed on the target quantum circuit to reduce (mitigate) the errors that occur in quantum computing algorithms.

In step 407, calibration engine 202 of classical computer 102 calibrates the quantum error mitigation technique (e.g., zero noise extrapolation) based on the selected calibration (e.g., noise factors and extrapolation function).

As discussed above, in one embodiment, calibration engine 202 calibrates the quantum error mitigation technique (e.g., zero noise extrapolation) based on the selected calibration (e.g., noise factors and extrapolation function) by selecting the settings for the quantum error mitigation technique to correspond to the noise factors and extrapolation function of the selected calibration. In this manner, the appropriate calibration (combination of noise factors and an extrapolation function) or settings are performed on the quantum error mitigation technique (e.g., zero noise extrapolation) without multiple iterations.

In step 408, calibration engine 202 of classical computer 102 performs the calibrated quantum error mitigation technique on the target quantum circuit.

As stated above, in one embodiment, calibration engine 202 is configured to select the calibration, calibrate the quantum error mitigation technique based on the selected calibration and perform the calibrated quantum error mitigation technique on the target quantum circuit using various software tools, including, but not limited to, Mitiq, Cirq®, Qiskit®, QCircuits, Yao, Qulacs®, staq, etc.

In one embodiment, in situations in which quantum circuits are structurally similar to the target quantum circuit within a threshold degree of similarity, which may be user-designated, and the quantum error mitigation technique performed on such quantum circuits has been previously calibrated, such calibrated parameters may be retrieved by calibration engine 202 to calibrate the quantum error mitigation technique (e.g., zero noise extrapolation) to be utilized on the target quantum circuit. Upon calibrating the quantum error mitigation technique, calibration engine 202 performs the calibrated quantum error mitigation technique on the target quantum circuit. As discussed above, "similarity of structure," as used herein, refers to a quantum circuit having a structure consisting of a collection of quantum gates, including the number and the type of gates as well as the interconnection scheme, within a threshold degree of similarity as the structure of another quantum circuit, such as the target quantum circuit. In one embodiment, the threshold degree of similarity is user-designated. In one embodiment, calibration engine 202 determines the structural similarity between quantum circuits, including a previously calibrated quantum circuit and the target quantum circuit, using various software tools, including, but not limited to, Cirq®, Qiskit®, QCircuits, Yao, Qulacs®, staq, etc.

In this manner, a quantum error mitigation technique (e.g., zero noise extrapolation) is automatically calibrated with the appropriate settings (e.g., noise factors, extrapolation function) to achieve a zero-noise value by the target quantum circuit without requiring multiple iterations.

Furthermore, the principles of the present disclosure improve the technology or technical field involving quantum error mitigation techniques.

As discussed above, quantum error mitigation refers to a series of techniques aimed at reducing (mitigating) the errors that occur in quantum computing algorithms. Such techniques involve running additional mitigation circuits or modified target circuits. As a result, the use of quantum error mitigation techniques generally results in longer execution times or requires access to additional qubits for increased accuracy. An example of the former is probabilistic error cancellation where the noise of the target circuit is learned layer by layer and then cancelled in a probabilistic manner with an exponential overhead to control the subsequent spread in the variance of expectation values. An example of the latter is virtual distillation that requires high connectivity to "distill" multiple copies of the noisy quantum state into a pure one. One of the most common methods for quantum error mitigation that involves running additional mitigation circuits is zero noise extrapolation. Zero noise extrapolation is an error mitigation technique used to extrapolate the noiseless expectation value (probabilistic expected value of the quantum circuit with zero noise) of an observable from a range of expectation values computed at different noise levels. For example, the noiseless expectation value (also referred to as the "zero-noise" value) is extrapolated by fitting a function (referred to as an "extrapolation function") to the expectation values of the mitigation circuits measured at different noise levels, where the noise has been tuned by noise factors (indicates the "noisiness" of the quantum circuit, such as difference noise levels) achieved by inserting additional digital quantum gates. While a quantum error mitigation technique, such as zero noise extrapolation, is conceptionally straightforward, there are myriad subtleties in its practical application, including selecting the settings of the technique, such as noise factors and the extrapolation function. By not knowing apriori which settings to choose, it drastically slows down the workflow for noisy quantum computation by requiring multiple iterations to select such settings.

Embodiments of the present disclosure improve such technology by saving calibrations of the quantum error mitigation technique corresponding to combinations of noise factors and extrapolation functions that when applied to quantum circuits achieve an expectation value that is close to a zero-noise value within a threshold degree of accuracy. In one embodiment, such quantum circuits correspond to quantum circuits of varying depths that represent the target quantum circuit. A calibration (combination of noise factors and an extrapolation function) is then selected from the saved calibrations based on the depth of the target quantum circuit. In one embodiment, such a calibration is selected among the saved calibrations based on matching the depth of the target quantum circuit with the depth of the quantum circuit associated with the calibration consisting of a combination of noise factors and an extrapolation function. The quantum error mitigation technique is then calibrated based on the selected calibration. The calibrated quantum error mitigation technique is then performed on the target quantum circuit. In this manner, a quantum error mitigation technique (e.g., zero noise extrapolation) is automatically calibrated with the appropriate settings (e.g., noise factors, extrapolation function) to achieve a zero-noise value by the target quantum circuit without requiring multiple iterations. Furthermore, in this manner, there is an improvement in the technical field involving quantum error mitigation techniques.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

In one embodiment of the present disclosure, a method for calibrating a quantum error mitigation technique with appropriate settings comprises saving calibrations of the quantum error mitigation technique corresponding to combinations of noise factors and extrapolation functions that when applied to quantum circuits achieve an expectation value that is close to a zero-noise value within a first threshold value. The method further comprises receiving a target quantum circuit. The method additionally comprises calibrating the quantum error mitigation technique based on selecting a calibration from the saved calibrations of the quantum error mitigation technique. Furthermore, the method comprises performing the calibrated quantum error mitigation technique on the target quantum circuit.

Additionally, in one embodiment of the present disclosure, the method further comprises generating the quantum circuits with varying depths to represent the target quantum circuit.

Furthermore, in one embodiment of the present disclosure, the method additionally comprises collecting expectation values for combinations of noise factors and extrapolation functions that are applied when executing the quantum circuits.

Additionally, in one embodiment of the present disclosure, the method further comprises computing an error in achieving the zero-noise value for different combinations of noise factors and extrapolation functions that are applied when executing the quantum circuits.

Furthermore, in one embodiment of the present disclosure, the saved calibrations of the quantum error mitigation technique correspond to those combinations of the noise factors and the extrapolation functions with a corresponding error in achieving the zero-noise value below a second threshold value.

Additionally, in one embodiment of the present disclosure, the method further comprises selecting the calibration of the saved calibrations of the quantum error mitigation technique based on a depth of the target quantum circuit.

Furthermore, in one embodiment of the present disclosure, the method additionally comprises calibrating the quantum error mitigation technique using calibrated parameters used to calibrate the quantum error mitigation technique performed on a different quantum circuit.

Other forms of the embodiments of the method described above are in a system and in a computer program product.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for calibrating a quantum error mitigation technique with appropriate settings, the method comprising:
saving calibrations of said quantum error mitigation technique corresponding to combinations of noise factors and extrapolation functions that when applied to quantum circuits achieve an expectation value that is close to a zero-noise value within a first threshold value;
receiving a target quantum circuit;
calibrating said quantum error mitigation technique based on selecting a calibration from said saved calibrations of said quantum error mitigation technique; and
performing said calibrated quantum error mitigation technique on said target quantum circuit.

2. The method as recited in claim 1 further comprising:
generating said quantum circuits with varying depths to represent said target quantum circuit.

3. The method as recited in claim 1 further comprising:
collecting expectation values for combinations of noise factors and extrapolation functions that are applied when executing said quantum circuits.

4. The method as recited in claim 1 further comprising:
computing an error in achieving said zero-noise value for different combinations of noise factors and extrapolation functions that are applied when executing said quantum circuits.

5. The method as recited in claim 4, wherein said saved calibrations of said quantum error mitigation technique correspond to those combinations of said noise factors and said extrapolation functions with a corresponding error in achieving said zero-noise value below a second threshold value.

6. The method as recited in claim 1 further comprising:
selecting said calibration of said saved calibrations of said quantum error mitigation technique based on a depth of said target quantum circuit.

7. The method as recited in claim 1 further comprising:
calibrating said quantum error mitigation technique using calibrated parameters used to calibrate said quantum error mitigation technique performed on a different quantum circuit.

8. A computer program product for calibrating a quantum error mitigation technique with appropriate settings, the computer program product comprising one or more computer readable storage mediums having program code embodied therewith, the program code comprising programming instructions for:
saving calibrations of said quantum error mitigation technique corresponding to combinations of noise factors and extrapolation functions that when applied to quantum circuits achieve an expectation value that is close to a zero-noise value within a first threshold value;
receiving a target quantum circuit;
calibrating said quantum error mitigation technique based on selecting a calibration from said saved calibrations of said quantum error mitigation technique; and
performing said calibrated quantum error mitigation technique on said target quantum circuit.

9. The computer program product as recited in claim 8, wherein the program code further comprises the programming instructions for:
generating said quantum circuits with varying depths to represent said target quantum circuit.

10. The computer program product as recited in claim 8, wherein the program code further comprises the programming instructions for:
collecting expectation values for combinations of noise factors and extrapolation functions that are applied when executing said quantum circuits.

11. The computer program product as recited in claim 8, wherein the program code further comprises the programming instructions for:
computing an error in achieving said zero-noise value for different combinations of noise factors and extrapolation functions that are applied when executing said quantum circuits.

12. The computer program product as recited in claim 11, wherein said saved calibrations of said quantum error mitigation technique correspond to those combinations of said noise factors and said extrapolation functions with a corresponding error in achieving said zero-noise value below a second threshold value.

13. The computer program product as recited in claim 8, wherein the program code further comprises the programming instructions for:
selecting said calibration of said saved calibrations of said quantum error mitigation technique based on a depth of said target quantum circuit.

14. The computer program product as recited in claim 8, wherein the program code further comprises the programming instructions for:
calibrating said quantum error mitigation technique using calibrated parameters used to calibrate said quantum error mitigation technique performed on a different quantum circuit.

15. A system, comprising:
a memory for storing a computer program for calibrating a quantum error mitigation technique with appropriate settings; and
a processor connected to said memory, wherein said processor is configured to execute program instructions of the computer program comprising:
saving calibrations of said quantum error mitigation technique corresponding to combinations of noise factors and extrapolation functions that when applied to quantum circuits achieve an expectation value that is close to a zero-noise value within a first threshold value;
receiving a target quantum circuit;
calibrating said quantum error mitigation technique based on selecting a calibration from said saved calibrations of said quantum error mitigation technique; and
performing said calibrated quantum error mitigation technique on said target quantum circuit.

16. The system as recited in claim 15, wherein the program instructions of the computer program further comprise:
generating said quantum circuits with varying depths to represent said target quantum circuit.

17. The system as recited in claim 15, wherein the program instructions of the computer program further comprise:
collecting expectation values for combinations of noise factors and extrapolation functions that are applied when executing said quantum circuits.

18. The system as recited in claim 15, wherein the program instructions of the computer program further comprise:
  computing an error in achieving said zero-noise value for different combinations of noise factors and extrapolation functions that are applied when executing said quantum circuits.

19. The system as recited in claim 18, wherein said saved calibrations of said quantum error mitigation technique correspond to those combinations of said noise factors and said extrapolation functions with a corresponding error in achieving said zero-noise value below a second threshold value.

20. The system as recited in claim 15, wherein the program instructions of the computer program further comprise:
  selecting said calibration of said saved calibrations of said quantum error mitigation technique based on a depth of said target quantum circuit.

\* \* \* \* \*